J. T. COSTELLO.
SEPARATOR.
APPLICATION FILED MAY 22, 1918.
1,359,578.
Patented Nov. 23, 1920.
2 SHEETS—SHEET 1.
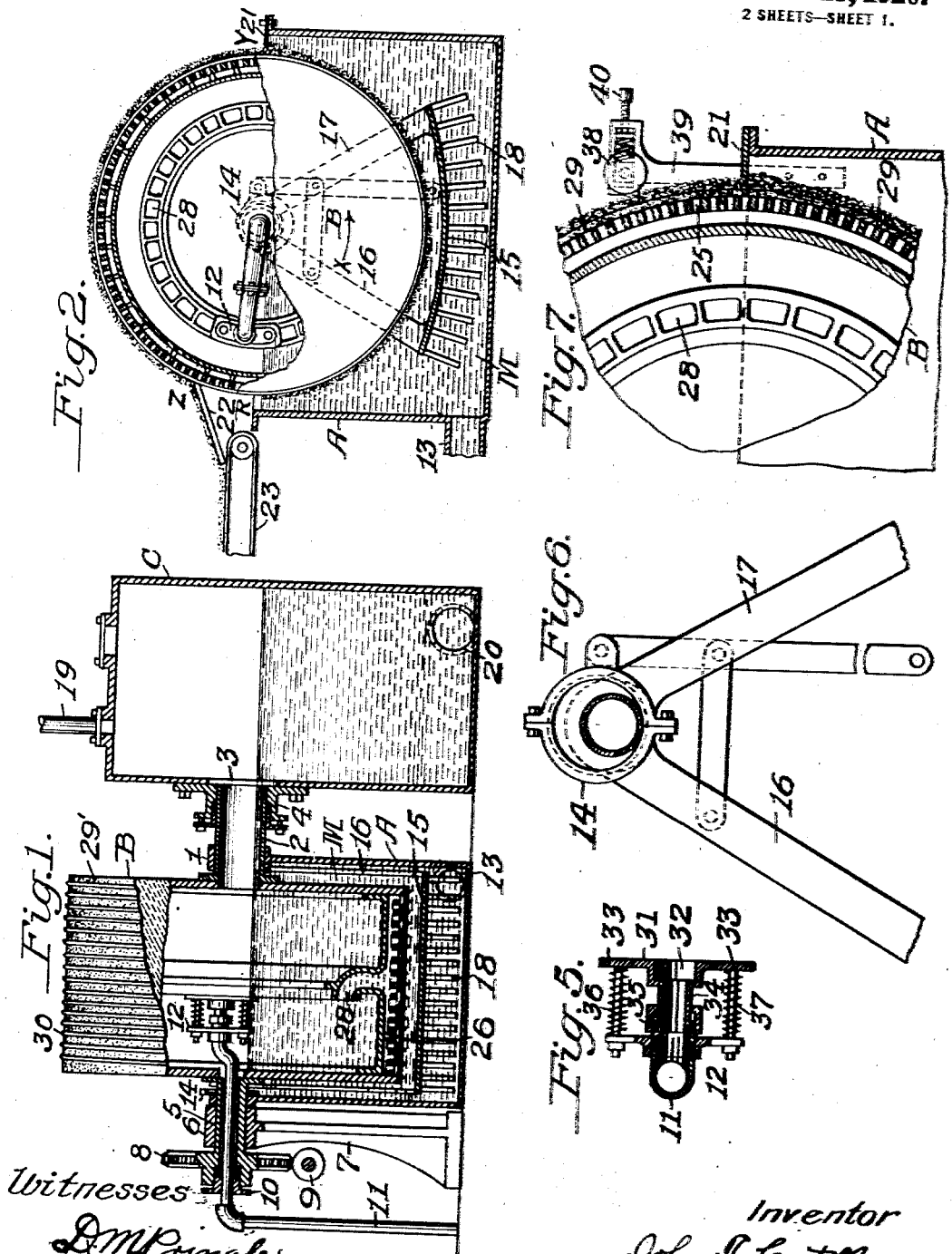
Witnesses
D. M. Pringle
L. J. Kelly
Inventor
John T. Costello
By T. B. Humphries
Attorney

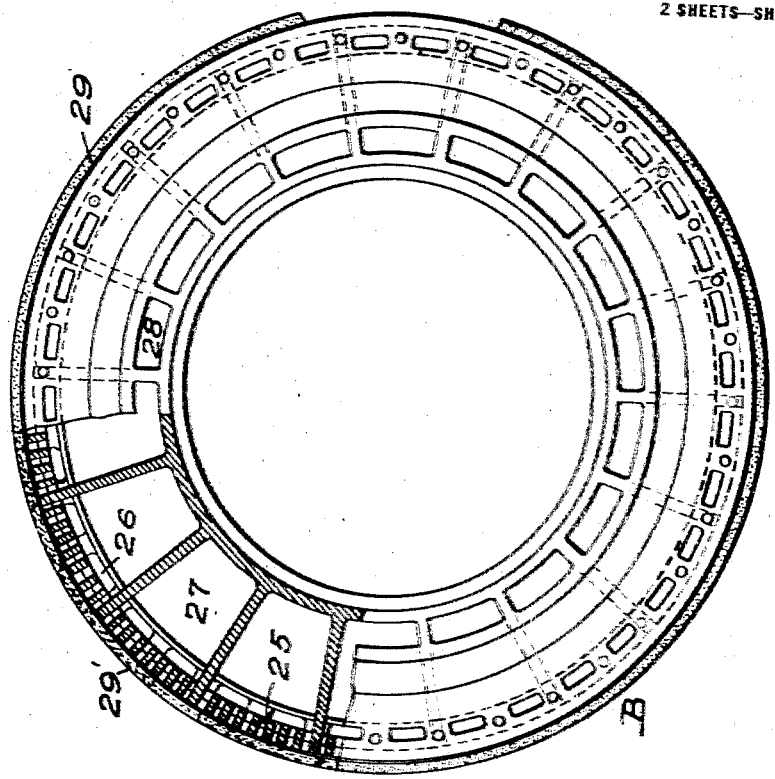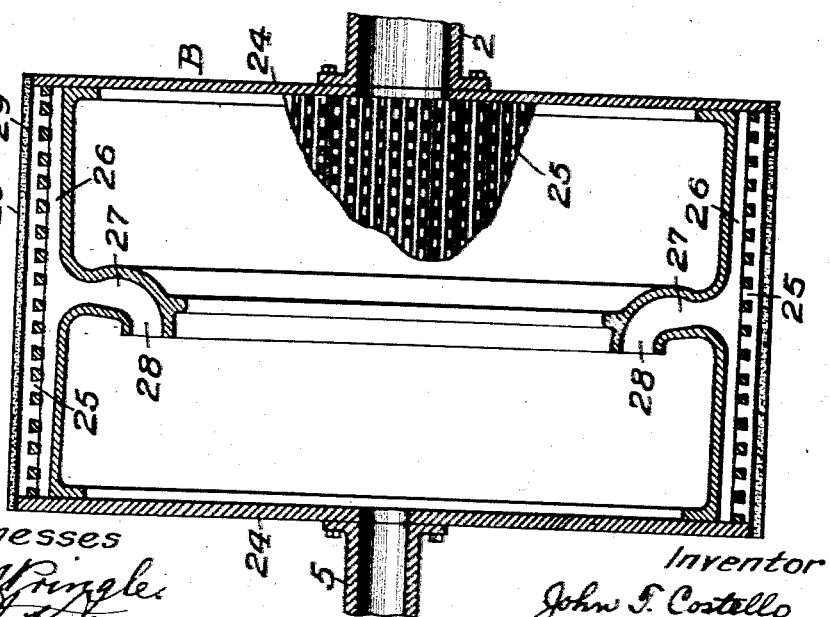

UNITED STATES PATENT OFFICE.

JOHN T. COSTELLO, OF PITTSBURGH, PENNSYLVANIA.

SEPARATOR.

1,359,578.  Specification of Letters Patent.  Patented Nov. 23, 1920.

Application filed May 22, 1918. Serial No. 235,941.

*To all whom it may concern:*

Be it known that I, JOHN T. COSTELLO, a citizen of the United States, residing at Pittsburgh, in the county of Allegheny and State of Pennsylvania, have invented a new and useful Improvement in Separators, of which the following is a specification.

My invention relates to separators and more particularly to a type of separator which may be used for filtering or separating solids from liquids, or in turn separating liquids from solids.

The first object of my invention is to provide a cheap, simple and efficient form of filter or separator by which great quantities of solid matter may be removed from liquids in a short space of time without any manual labor or external assistance. A further object of my invention is to provide a separator wherein the solids are removed from the liquids and partially dried before being taken from said apparatus. Still a further object of my invention is to provide a filter for separating solids from liquids and collecting the same without discontinuing the operation of the apparatus.

My invention consists, generally stated, in the novel arrangement, construction, and combination of parts as hereinafter more specifically set forth and described and particularly pointed out in the appended claims.

To enable others skilled in the art to which my invention appertains to construct, operate and use my improved filter, I will describe the same more fully, referring to the accompanying drawings, in which—

Figure 1 is a side elevation of my improved filter and connecting parts, showing some of the same in section.

Fig. 2 is a cross sectional view of the main supply compartment showing the rotating drum therein with part of the same in section.

Fig. 3 is a vertical sectional view of the drum showing a part of the periphery of the same.

Fig. 4 is an end view of the same with the side wall removed showing a part thereof in section.

Fig. 5 is a longitudinal sectional view of the compressed air valve employed.

Fig. 6 is a partial front view of the reciprocating device used for operating the agitator shown in Figs. 1 and 2.

Fig. 7 is a partial view of the drum showing a slight modification.

Like symbols of reference herein indicate like parts in each of the figures of the drawings.

As illustrated in the drawings my improved separator consists of a supply tank A, the revolving drum B, and the reservoir C, all of which are shown in Fig. 1. The tank A is open at the top and is supplied with a bearing 1 at the center of one side wall of the same, into which the hollow shaft 2 of the drum B is adapted to fit and rotate therein. This hollow shaft 2 of the drum B extends to, and communicates with the reservoir C through the opening 3 in the same. The hollow shaft 2 is provided with suitable stuffing boxes 4 to prevent any leakage of air or liquid through the same. The other side of the drum B is also provided with a hollow shaft 5 which rotates within the housing 6 at the upper end of the pedestal 7 while the outer end of said shaft is provided with a worm gear 8 which meshes with a suitable worm 9 from any suitable source of power. This shaft 5 is also provided with suitable stuffing boxes 10 to prevent any escape of air or liquid through the hollow shaft 5, while a compressed air pipe 11 from any suitable source of supply passes through said last named hollow shaft and connects with the valve device 12, as hereinafter explained.

The supply tank A is provided with a supply pipe 13 at one end of the same for supplying the material to be separated.

Secured upon the hollow shaft 5 is an eccentric 14 which is connected to the agitator 15 by suitable rods 16 and 17 and said agitator is provided with a series of fingers 18 for agitating the material M in the tank A. The reservoir C is provided with a pipe 19 through which air is drawn, thus creating a suction causing the particles of solids in the material M to adhere to the drum B as later explained. The reservoir C is also provided with a pipe 20 for carrying off the superfluous liquid contained therein, and this pipe, if necessary may be provided with means for drawing the liquid from the reservoir C. At one side of the tank A and at a position above the line of the material M is a leveling plate 21, while at the other side of said tank is a cutting member 22 below which is an endless belt 23 as later explained.

The drum B is preferably cylindrical in shape and may be constructed in any suitable manner such for instance as shown in Fig. 3 where the outer walls are formed by plate 24 to which the shafts 2 and 5 are connected. The periphery of the drum B is provided with a series of continuous openings 25, an equal number of which communicate with a series of chambers 26 within said drum, and each of said chambers is provided with an inwardly extending passageway 27 which has an opening 28 on one side of the same for communicating at certain intervals with the valve device 12 as later explained. The periphery of the drum B is completely covered, with a canvas or textile material 29 and this in turn is completely covered preferably with flannel or felt material 29' and the whole secured thereon by means of wire or steel bands 30.

The valve device 12 which is connected to the end of the compressed air pipe 11 may be of any desired construction and the type shown consists of a face portion 31 having an opening which is the same size and shape as the opening 28 in the passageway 27 leading from the chambers 26 of the drum B and is provided with a wing 33 on each side of said opening which is sufficiently long to cover the opening 28 on each side of the one with which the opening 32 is communicating. This face portion 31 is provided with a sliding portion 34 which has a hollow interior communicating with the opening 32 and said sliding portion fits within the end of the compressed air pipe 11 and said connection is supplied with a suitable stuffing box 35. Secured to a position near the end of the compressed air pipe 11 is a bracket 36 which has bolts 37 connecting with each of the wings 33 and coil springs 37 fit around said bolts and exert pressure between the said bracket and the said wings so as to keep the face portion 31 at its outward position.

Fig. 7 shows a modification by which if desired, the material can be slightly pressed by the roller 38 on the supports 39 after leaving the leveler 21. The tension of the roller 38 can be adjusted by the set screw 40.

The operation of my improved separator is as follows:—

The material M to be separated is passed into the tank A through the supply pipe 13, and the drum B is then rotated through means of the worm 9 communicating with the worm gear 8 on the hollow shaft 5. The drum B will usually be rotated at a slow speed but this will depend upon the size of the separator and the material to be separated. During this rotation the air will be drawn from the reservoir C and the hollow shaft 2 and the drum B by means of suction from the pipe 19 which will tend to create a vacuum in the drum B and thus cause the solid matter in the material M to adhere to the flannel or felt material 29'.

Let us consider the drum rotating in the direction of the arrow X in Fig. 2 and consider that portion of drum at the point R entering the mixture M in the tank A. At this point the suction in the interior of the drum will draw the water or liquid through the textile material 29 and the flannel felt 29' into the interior of the drum B causing the solid matter which may be either mineral, vegetable or animal, to adhere to the flannel or felt material 29' on the periphery of the drum. This suction continues until such time as the drum reaches the position Y where the leveler 21 will level the solid matter evenly over the face of the drum. As the rotation continues the suction will tend to dry the solid matter by drawing moisture from the same until the point considered has reached the position Z where the knife or cleaner will cut the solid matter from the flelt or flannel material 29' where it will drop onto the endless belt 23 and be carried to any desired point. Immediately after the solid matter has been removed the valve 12 will communicate with the opening 28 in the passageway 27 immediately opposite the cleaned portion of the flannel or felt material, thus cutting off the suction from the chamber 26 with which this particular opening 28 communicates and compressed air from the pipe 11 will be forced into this particular chamber and thus the flannel or felt and textile material covering this particular chamber 26 will be cleansed ready for entrance into the tank A. In this connection the wings 31 on the valve 12 will cover the adjoining openings 28 on each side of the one upon which the compressed air is being exerted, so that the compressed air will operate on each opening 28 for the length of time taken for the same to pass.

The suction will be exerted through all the openings 28 at all times with the exception of the particular openings covered by the valve 12. During this process the agitator 15 operated by the eccentric 14 keeps the solid matter in the bottom of the tank stirred up so as to prevent its accumulating. The liquid which passes into the interior of the tank B will be carried away through the hollow shaft 2 and opening 3 into the reservoir C from whence it will be drawn through the pipe 20 by an elevation or other suitable means to overcome the vacuum created by the pipe 19.

In the use of the modification shown in Fig. 7 the solid material, after being leveled at the point Y will be pressed by the roller 38 in order to squeeze as much liquid as possible from the same, thus assisting the vacuum in the interior of the drum.

It will readily be seen that with the use of my improved separator great quantities of material may be readily separated and the solids dried and collected without stopping the drum.

It will be apparent that my improved separator may be used in multiple and the filtered liquid from the tank C may be passed into another tank B where the same process will again take place.

On account of the simplicity of the device there will be a great reduction in labor, as the apparatus can readily be taken care of by one man.

My invention will prove of especial value in aluminum plants for separating the bauxite, also in paper mills for separating the pulp from the liquids, in salt works for saving the draining of the salt and handling of the same. My invention will also prove of great value in chemical works for separating the liquid and solid materials and may be used to great advantage to assist in sewage disposal.

It is understood that I do not limit myself to any of the constructions shown in the drawings, as various modifications and changes in the design, construction, and operation of my improved separator may be resorted to without departing from the spirit of the invention or sacrificing any of its advantages.

What I claim as my invention and desire to secure by Letters Patent is:—

1. A separator comprising a tank into which the mixture to be separated is passed, a rotatable drum having a porous periphery in said tank partially submerged in said mixture, a reservoir communicating with the interior of said drum and having connected therewith means for creating a vacuum in said drum, whereby the solids from the mixture in said tank are accumulated on the periphery of said drum and the liquid drawn within said drum, means for removing the solids from the periphery of said drum, and means for successively introducing compressed air on certain portions of said drum to clean the excess solids therefrom.

2. A separator comprising a tank into which the mixture to be separated is passed, a rotatable drum having a porous periphery in said tank partially submerged in said mixture, a series of non-communicating chambers around the periphery of said drum, a reservoir communicating with the interior of said drum and having connected therewith means for creating a vacuum in said drum whereby the solids from the mixture in said tank are accumulated on the periphery of said drum and the liquid drawn within said drum, means for removing the solids from the periphery of said drum and means engaging successively with the chambers in said drum whereby compressed air is introduced in said chambers to cleanse the excess solids from the periphery of said drum.

In witness whereof, I, the said JOHN T. COSTELLO, have hereunto set my hand in the presence of two subscribing witnesses.

JOHN T. COSTELLO.

Witnesses:
  T. B. HUMPHRIES,
  J. RAYMOND SOWASL.